(12) United States Patent
Aguilera et al.

(10) Patent No.: US 8,909,677 B1
(45) Date of Patent: Dec. 9, 2014

(54) PROVIDING A DISTRIBUTED BALANCED TREE ACROSS PLURAL SERVERS

(75) Inventors: Marcos K. Aguilera, Mountain View, CA (US); Wojciech Golab, Ajax (CA); Mehul A. Shah, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2009 days.

(21) Appl. No.: 11/796,198

(22) Filed: Apr. 27, 2007

(51) Int. Cl.
*G06F 7/00* (2006.01)

(52) U.S. Cl.
USPC .......................................... 707/797

(58) Field of Classification Search
None
See application file for complete search history.

(56) References Cited

U.S. PATENT DOCUMENTS

| | | | | |
|---|---|---|---|---|
| 6,457,065 | B1 * | 9/2002 | Rich et al. | 719/328 |
| 6,834,301 | B1 * | 12/2004 | Hanchett | 709/223 |
| 7,269,821 | B2 * | 9/2007 | Sahinoja et al. | 717/106 |
| 7,383,276 | B2 * | 6/2008 | Lomet | 707/102 |
| 2004/0044702 | A1 * | 3/2004 | Ferreira Alves et al. | 707/203 |
| 2005/0027797 | A1 * | 2/2005 | San Andres et al. | 709/203 |
| 2005/0128526 | A1 | 6/2005 | Kaltenecker et al. | |
| 2006/0015626 | A1 * | 1/2006 | Hallamaa et al. | 709/229 |
| 2006/0069786 | A1 | 3/2006 | Mogul et al. | |
| 2006/0206537 | A1 * | 9/2006 | Chiang | 707/200 |
| 2006/0282546 | A1 | 12/2006 | Reynolds et al. | |

OTHER PUBLICATIONS

M.K. Aguilera et al., U.S. Appl. No. 11/450,987, entitled "Transactional Shared Memory System and Method of Control," filed Jul. 12, 2006, pp. 1-26, Figs. 1-7.
R. Bayer, "Symmetric Binary B-Trees: Data Structure and Maintenance Algorithms*," Acta Informatica, 1(4):290-306, 1972.
A. Biliris, "Operation Specific Locking in B-Trees," Proceedings of the Sixth ACM SIGACT—SIGMOD-SIGART Symposium on Principles of Database Systems, pp. 159-169, Mar. 1987.
R. Bayer et al., "Concurrency of Operations on B-Trees," Acta Informatica, 9:1-21, 1977.
C.A. Ellis, "Concurrent Search and Insertion in 2-3 Tree*," Acta Informatica, 14:63-86, 1980.
T. Johnson et al., "A Distributed Data-Balanced Dictionary Based on the B-Link Tree," Technical Report MIT/LCS/TR-530, MIT, pp. 1-20, 1992.
T. Johnson et al., "A Distributed, Replicated, Data-Balanced Search Structure," Technical Report 028, Dept. of Computer & Information Science and Engineering, University of Florida, pp. 1-27, 1993.
Y.S. Kwong et al., "A New Method for Concurrency in B-Trees," IEEE Transactions on Software Engineering, SE-8(3):211-222, May 1982.
Litwin et al., "Rp*: A Family of Order Preserving Scalable Distributed Data Structures," Proceedings of the 20th International Conference on Very Large Data Bases, pp. 342-353, Sep. 1994.

(Continued)

*Primary Examiner* — Apu Mofiz
*Assistant Examiner* — Thu Nga Nguyen

(57) ABSTRACT

To access data, a distributed balanced tree having nodes distributed across plural servers is accessed. Version information is associated with the nodes of the distributed balanced tree. During an operation that accesses the distributed balanced tree, the version information is checked to determine whether content of one or more nodes of the distributed balanced tree has changed during the operation.

19 Claims, 4 Drawing Sheets

(56) References Cited

OTHER PUBLICATIONS

W. Litwin et al., "Lh*g: A High-Availability Scalable Distributed Data Structure Through Record Grouping," IEEE Transactions on Knowledge and Data Engineering, 14(4):923-927, 2002.

V. Lanin et al., "A Symmetric Concurrent B-Tree Algorithm," Proceedings of the Fall Joint Computer Conference, pp. 380-389, 1986.

P.L. Lehman et al., "Efficient Locking for Concurrent Operations on B-Tree," ACM Transactions on Database Systems, 6(4):650-670, 1981.

C. Mohan et al., "ARIES/IM: An Efficient and High Concurrency Index Management Method Using Write-Ahead Logging," Proceedings of the 1992 ACM SIGMOD International Conference on Management of Data, pp. 371-380, Jun. 1992.

J. MacCormick et al., "Boxwood: Abstractions as the Foundation for Storage Infrastructure, Proceedings of the 6th Symposium on Operating Systems Design and Implementation," pp. 105-120, Dec. 2004.

Y. Mond et al., "Concurrency Control in B-Trees Databases Using Preparatory Operations, Proceedings of the 11th International Conference on Very Large Data Bases," pp. 331-334, Aug. 1985.

D. Shasha et al., "Concurrent Search Structure Algorithms," ACM Transaction on Database Systems, 13(1):53-90, 1988.

D. Shasha et al., "An Analytical Model for the Performance of Concurrent B Tree Algorithms," Technical Report 124, NYU Ultracomputer Lab, pp. 1-30, 1987.

P. Wang, "An In-Depth Analysis of Concurrent B-Tree Algorithms," Technical Report MIT/LCS/TR496, MIT Laboratory for Computer Science, Abstract Only, 1991.

W.E. Weihl et al., "Multi-Version Memory: Software Cache Management for Concurrent B-Trees (extended Abstract)," Proceedings of the Second IEEE Symposium on Parallel and Distributed Processing, pp. 650-655, Dec. 1990.

* cited by examiner

| SERVER 1 | |
|---|---|
| node | version |
| 1 | v2 |
| 2 | v3 |
| 3 | v3 |
| 5 | v2 |

| SERVER 2 | |
|---|---|
| node | version |
| 1 | v2 |
| 2 | v3 |
| 3 | v3 |
| 7 | v2 |

| SERVER 3 | |
|---|---|
| node | version |
| 1 | v2 |
| 2 | v3 |
| 3 | v3 |
| 4 | v3 |

| SERVER 4 | |
|---|---|
| node | version |
| 1 | v2 |
| 2 | v3 |
| 3 | v3 |
| 6 | v2 |
| 8 | v4 |

PROVIDING A DISTRIBUTED BALANCED TREE ACROSS PLURAL SERVERS

BACKGROUND

A B-tree is a type of a search tree that supports insertion, lookup, deletion, and other types of operations such that data access operations with respect to a storage infrastructure are made more efficient. A B-tree is made up of a tree of nodes, including a root node, intermediate nodes, and leaf nodes. Values associated with keys are stored at the leaf nodes. The internal nodes (non-leaf nodes) of the B-tree contain pointers to lower-level nodes. A search for a particular key performed with a B-tree starts at the root node, and the B-tree is traversed from top to bottom. Once the leaf node with the particular key is found, then the value associated with the key can be retrieved.

Various proposals for distributing B-trees across a distributed system have been made to enhance the efficiency of B-trees. However, such proposals suffer from various drawbacks, including one or more of lack of fault tolerance, reduced performance due to bottlenecks at some nodes of the B-trees, and others.

BRIEF DESCRIPTION OF THE DRAWINGS

Some embodiments of the invention are described with respect to the following figures.

DETAILED DESCRIPTION

Figure 1:
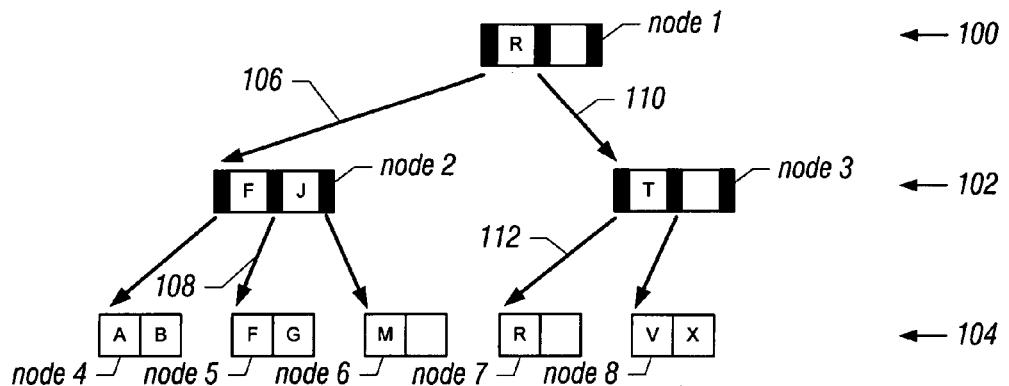
FIGS. 1 and 2 illustrate example B-trees.

In accordance with some embodiments, a distributed balanced data structure (in the form of a distributed balanced tree) is implemented across multiple hosts. A "host" refers to a machine, such as a computer. In some implementations, the distributed balanced tree includes a distributed B-tree or any variant of a B-tree, such as the B+-tree. A "B-tree" thus refers to a B-tree or any of its variants. The distributed B-tree stored in multiple hosts is accessible by clients that desire certain operations to be performed. These hosts storing the distributed B-tree are also referred to as "servers."

A "client" refers to a computer, a software process running on a computer, or a user at a computer that desires to access (lookup, insert, delete, etc.) the distributed B-tree for the purpose of performing an operation, such as a storage access operation.

A data structure is distributed if the data structure is stored on different hosts in a network. In the context of a distributed system, a data structure is balanced if no host or group of hosts stores a disproportionately high fraction of the data structure. Furthermore, a data structure is balanced if the elements are stored in a tree whose depth (number of levels of the tree) is logarithmic with respect to the number of nodes of the tree. A data structure is ordered if there is an efficient way to navigate through the elements of the data structure according to some order with respect to a key that is being searched. A "key" refers to some attribute that is used to sort or identify corresponding data records.

An example application of a distributed B-tree can be a phone directory. In the phone directory, a key of the B-tree can be a name of a person, while a value associated with a key and stored in a leaf node of the B-tree can be a phone number. Because a phone directory can be very large or because it is accessed frequently, it is desirable to distribute the phone directory across many hosts. A client refers to any computer (or a process within the computer), or a user using the computer, that wishes to lookup names in, insert new entries into, update entries in, or delete entries from the phone directory.

A distributed balanced tree according to some embodiments maintains version numbers for nodes in the distributed B-tree. The version number of a node in the tree is updated whenever a change is made to the node. The use of version numbers allows a client accessing the distributed B-tree to know if content of any node has changed since the last time the client has looked at the node. This information is useful to maintain consistency of the distributed B-tree such that multiple concurrent operations do not garble the internal organization of the distributed B-tree. More generally, "version information" is associated with a node of the distributed B-tree, where version information refers to a version number that increases or decreases with modification, a timestamp reflecting a time of change, a hash of content of the node, or any other information or sequence of bits that change when the content of the node changes.

When traversing the distributed B-tree to execute an operation such as lookup, insert, delete, update, and so forth, the version numbers of nodes that are traversed during the operation are collected. These version numbers can be checked later to determine whether content of one or more nodes of the tree has changed during the operation. A change to any particular node of the tree during a particular operation means that content of nodes retrieved in the traversal of the tree may no longer be valid, which means that the operation should not be allowed to complete successfully. In such cases, the operation can be retried.

Further features of some embodiments of implementing the distributed B-tree is the caching of at least some nodes of the tree at clients. Clients can then access the cached nodes when traversing the distributed B-tree such that the number of accesses of servers can be reduced. Reducing accesses of servers by clients reduces network congestion and processing loads on servers.

Moreover, version numbers of nodes can be replicated at various servers so that the version numbers are available at more locations such that the likelihood of any server being a bottleneck is reduced.

In addition, the distributed B-tree according to some embodiments provides support for "multi-operation transactions," which are transactions that include a sequence of one or more insert operations, one or more delete operations, and/or one or more update operations. For example, a multi-operation transaction allows for the transaction to atomically insert a key into the distributed B-tree and to remove another key from the distributed B-tree. A multi-operation transaction is thus a sequence of operations (that cause modification and/or retrieval of nodes of a distributed B-tree) that can be performed on the distributed B-tree as a single, indivisible (atomic) transaction.

In the ensuing discussion, reference is made to the B+-tree, which is a variant of a B-tree. However, it is noted that techniques according to some embodiments can be applied to other types of B-trees or other types of balanced trees.

FIG. 1 shows an example B+-tree with three levels 100, 102, and 104 (a tree with a depth of three). The B+-tree includes a root node (node 1) at level 100, and leaf nodes (nodes 4-8) at level 104. The leaf nodes store respective pairs of keys and associated values. For compactness, FIG. 1 does not show the values associated with the keys. The intermediate level 102 includes intermediate nodes (2, 3) between the root node 1 and the leaf nodes.

Each level holds several keys in increasing order (from left to right in FIG. 1), and has pointers (except at the lowest level 104 corresponding to the leaf nodes) to the next level. To look up a key, say key G in FIG. 1, which can be specified in a search request, the operation starts at the root node 1 and follows the leftmost edge 106 from the root node since G<R and R is the leftmost key at the root node. The edge traversed by the operation is based on a comparison of the key G and the keys stored in node 1 (in this case key R). The appropriate pointer stored in node 1 is then used to traverse to the next lower level of the B+-tree. In this example, the pointer points to the leftmost edge 106 to cause the operation to traverse to node 2. The operation then follows the middle edge 108 from node 2, since G is between F and J (the keys stored in node 2). The operation finally arrives at the node 5, where the key G is found.

To insert a key, say key S, the same procedure to look up S is first performed to find the leaf node where S would have been (note that the B+-tree of FIG. 1 does not contain key S). In FIG. 1, the operation starts at root node 1 and follows the second edge 110 since S>R, to node 3. The operation then follows the first edge 112 from node 3 since S<T, and T is the leftmost key in node 3. The operation arrives at leaf node 7. Since the leaf node has an empty slot, key S (which is not yet in the B+-tree) is inserted into the tree by simply placing adding key S to leaf node 7, next to key R.

Figure 2:
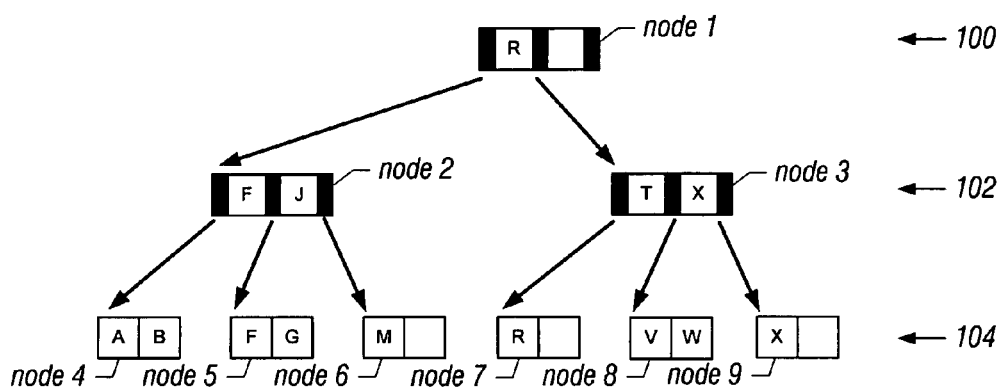

In another example, to insert key W, by following the procedure to look up W, the operation arrives at leaf node 8. But there is no room to insert key W into node 8 since all slots in node 8 are already occupied. As a result, node 8 has to be split into two nodes (node 8 and new node 9, as illustrated in FIG. 2). Also, the parent node 3 is modified to point to the new node 9 in FIG. 2.

Figure 3:
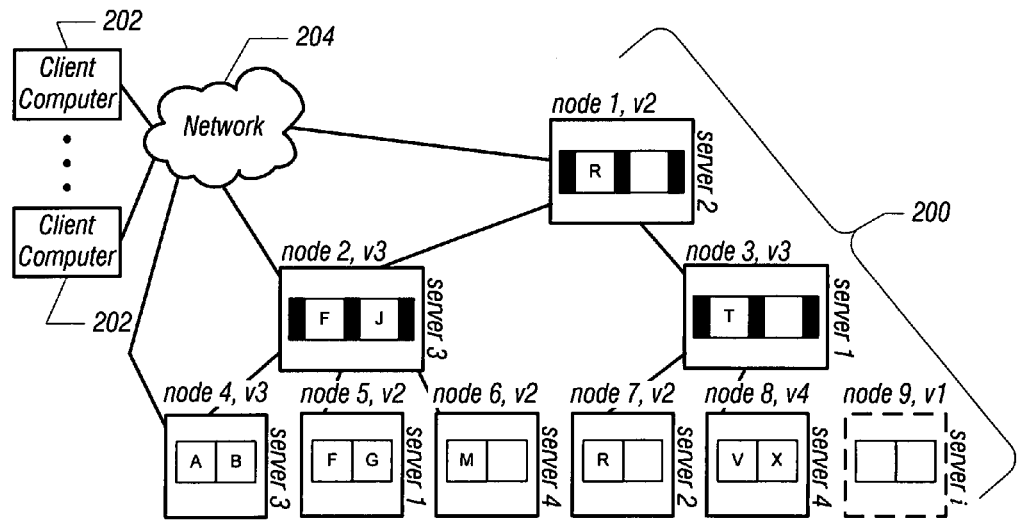
FIG. 3 shows a B-tree distributed across multiple servers, in accordance with an embodiment.

In accordance with some embodiments, as depicted in FIG. 3, a distributed B+-tree is distributed across a set of server hosts 200 (labeled servers 1, 2, 3, and 4 in FIG. 3). Note that the terms "host" and "server" are used interchangeably in this discussion. Each pointer (from one node to another node) of a B+-tree node includes a host (server) name and an index or offset within the server. Each B+-tree node can be at any of the set of servers, and the choice is typically made to balance load across the servers. Note that each server 200 can contain more than one B+-tree node at more than one level of the B+-tree. For example, server 1 contains intermediate node 3 (at level 102) and leaf node 5; server 2 contains root node 1 and leaf node 7; server 3 contains intermediate node 2 and leaf node 4; and server 4 contains leaf nodes 6 and 8.

A set of client computers 202 are coupled over a network 204 to the servers 200. The client computers 202 are able to access information in the distributed B+-tree. Alternatively, the client computers 202 may be co-located with the servers. Note that although reference is made to a "client computer" in the ensuing discussion, it is noted that the discussion is also applicable to a client that is a software process executing in a computer, or a user using the computer.

One challenge in implementing a distributed B+-tree is that many client computers may be concurrently performing operations on the tree. For example, one client computer may be looking up a key; a second client computer may be inserting a key that causes a node to be split; and a third client computer may be removing a key from the tree. Each client computer has to be careful so that they do not interfere with each other and destroy the consistency of the B+-tree.

To perform a lookup in the B+-tree, a client computer traverses the tree from a root node (the root node is at a known server) to the correct leaf node by contacting the appropriate servers. After the client computer has reached the leaf node where the key is supposed to be stored, the client computer then performs a check to ensure that the B+-tree nodes from root to leaf have not changed while the client was traversing the tree. This check includes contacting the servers containing the tree nodes that were traversed and asking such servers to compare the nodes in such servers with the nodes accessed by the client. To perform this check efficiently, each B+-tree node has a version number that is incremented when the node changes in any way. Thus, the client computer simply asks the servers to check the version numbers of the traversed B+-tree nodes against the version numbers that the client computer has seen. If those versions match, the client computer is able to complete its lookup operation successfully. Otherwise, if the versions do not match (which means that one or more tree nodes have changed during the lookup operation), the client computer restarts the lookup operation from the root node or, as an optimization, from the first node in the path that has changed.

For example, in FIG. 3, to look up key Y, which is not in the tree, a client computer contacts server 2, which holds the root node 1 of the B+-tree. In traversing the B+-tree to look up key Y, the client computer next contacts server 1 (which holds node 3), and then contacts server 4, which contains node 8, where key Y would have been if the key Y were in the tree. Node 1 has version number v2, node 3 has version number v3, and node 8 has version number v4. Before concluding that the key Y is not in the tree, the client computer can contact servers 2, 1, and 4 again to check (validate) that the version numbers of nodes 1, 3, and 8, remain v2, v3, and v4, respectively. These checks can be performed in parallel. If all version numbers match, the client computer knows that Y is not in the tree. Otherwise, if the version numbers do not match, the client computer stops (or aborts) the current lookup operation and restarts the lookup operation from the beginning.

To perform an insertion of a key in the B+-tree, the client computer first proceeds in the same manner as a lookup operation; the client computer traverses the B+-tree from root to leaf while collecting the version number of each traversed node. If the leaf node has room for the insertion, only the leaf node has to be changed. However, the client computer still has to ensure that the B+-tree nodes in the traversed path from root to leaf have not changed. To do so, the client computer executes an atomic batch of actions that include the following: (1) check that the version numbers of the nodes in the traversed path from root to leaf have not changed during the key insert operation, and (2) place the new key in the leaf node and update the leaf node's version number, conditionally on the checks in (1) having succeeded.

The atomicity of the batch of actions is achieved using a two-phase protocol that the client computer uses to contact the appropriate servers. In general, the two-phase protocol includes a first phase that checks the version numbers and locks the appropriate B+-tree nodes, while a second phase commits the changes (if the version numbers match) or aborts the changes (if the version numbers do not match). The locks are then released. Because locks are used, other client computers cannot interfere with the processing between the two phases. This two-phase protocol executes relatively quickly, without any other actions by the client computer between first and second phases, to minimize the time when nodes are locked. Reader-writer locks, instead of exclusive-mode locks, can be used to improve concurrency.

If the batch of actions aborts (because the node version numbers do not match what the client computer expected or for some other reason), the client computer restarts the key insertion transaction from the beginning. This is allowable because if the batch aborts the tree is not changed by the client computer in any way (a form of optimistic concurrent control). Optimistic concurrent control ensures that at least one client computer makes progress, because a batch can only abort if another batch has committed. For example, in FIG. 3, to insert key S, the client computer traverses nodes 1, 3, and 7 of the B+-tree, while collecting the version numbers of nodes 1, 3, and 7 (located on servers 2, 1, and 2, respectively). The client computer then executes an atomic batch of actions that include the following: (1) check that the version numbers of nodes 1, 3, and 7 have not changed at servers 2, 1, and 2, respectively, and (2) if those checks succeed, modify node 7 by inserting key S and increment node 7's version number to v3 from v2.

To perform an insertion that involves splitting of nodes (because the target leaf node has no room left for inserting the new key), the client computer has to modify not just the target leaf node, but interior (non-leaf) nodes as well. To do so, the client computer pre-calculates all modifications that the client computer has to perform, and accumulates those modifications in a batch, which is then executed atomically using the two-phase protocol. The batch also includes checking the version numbers of the B+-tree nodes that have been traversed, and the modifications are committed only if the version number checks succeed. As discussed above, if the modifications are not committed, the client computer restarts the key insertion from the beginning.

For example, in FIG. 3, to insert key W, the client computer traverses nodes 1, 3, and 8 of the B+-tree, while collecting their version numbers. Since there is no space left at node 8 for key W, node 8 has to be split into two nodes. To do so, the client computer executes an atomic batch that includes the following actions: (1) check that the versions of nodes 1, 3, and 8 have not changed at servers 2, 1, and 4, respectively, and (2) if those checks succeed, add a new leaf node 9 (represented as a dashed box in FIG. 3) with key X at one of the servers (in server i where i can be any number selected based on a load balancing criterion), set the version number for node 9, modify leaf node 8 to hold keys V and W, increment the version number of node 8, modify intermediate node 3 to include key X and to point to leaf node 9, and increment the version number of intermediate node 3.

If leaf node 9 is a newly created node that did not exist before, then the version number set for node 9 is v1. However, if node 9 was a previously deleted node, then addition of the node 9 is considered a re-allocation of the node to the B+-tree; in this case, the version number of node 9 is incremented from the previous version number of the node.

The above atomic batch is executed using the two-phase protocol, in which the client computer executes two roundtrips of communication with servers 1, 2, and 4; in each phase, all servers are contacted in parallel.

A deletion is performed similarly to the insertion: a client computer determines what nodes have to be changed, assembles a batch of actions that checks version numbers and applies those changes if all checks pass, and then executes the batch using the two-phase protocol.

Figure 4:
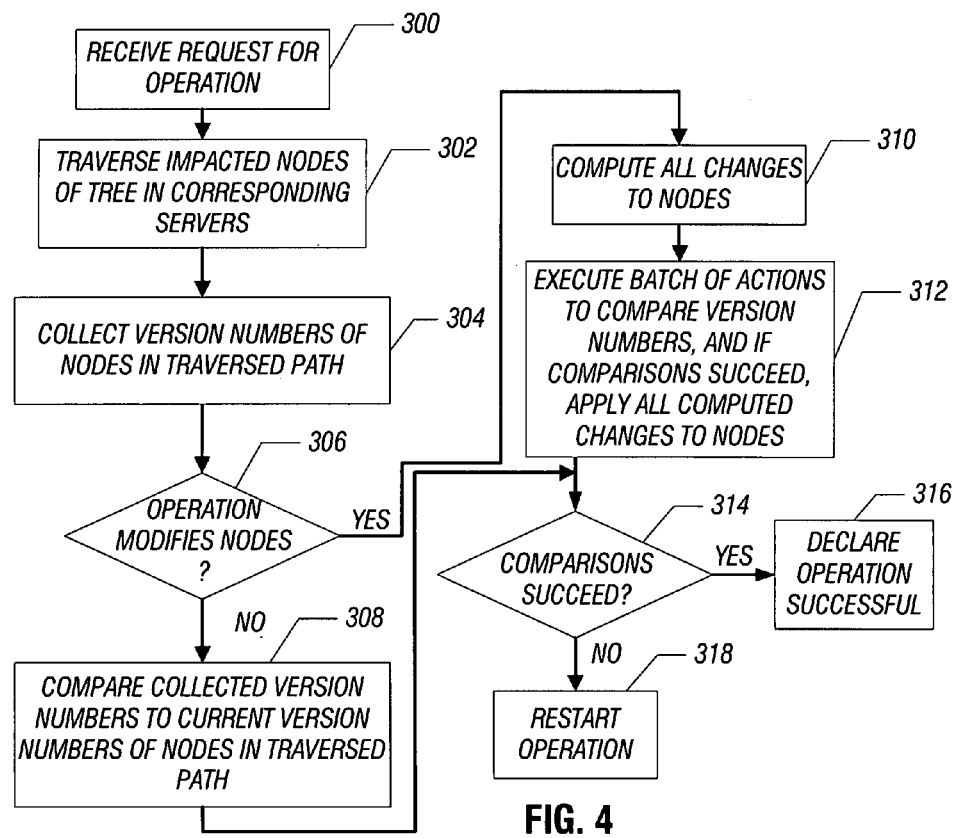
FIG. 4 is a flow diagram of a process of using a distributed B-tree according to an embodiment.

FIG. 4 shows a general process according to some embodiments. A client computer receives (at 300) a request for a particular operation, such as an operation to look up a key, an operation to insert a key, or an operation to delete a key from a B+-tree. The client computer 202, in response to the received request, traverses (at 302) the impacted nodes of the B+-tree in corresponding servers. Although reference is made to traversing nodes of the tree in the servers, it is noted that as a performance-enhancing feature, certain nodes of the tree can actually be cached in the client computer, so that the client computer does not actually have to access the specific servers for information pertaining to the corresponding nodes. The node-caching feature is discussed further below.

The client computer collects (at 304) version numbers of nodes in the traversed path. The client computer determines (at 306) whether the operation involves modification of nodes of the distributed B+-tree. If not, after reaching the leaf node of the path, the client computer then checks whether or not any of the nodes have been updated since the operation has begun by comparing (at 308) collected version numbers to current version numbers of nodes in the traversed path. If the check succeeds, as determined at 314 (which means that the nodes in the traversed path have not been updated during the operation), then the operation is declared successful (at 316) by committing the operation. However, if the check fails, as determined at 314 (which means that one or more nodes in the traversed path have changed during the operation), then the operation is restarted (at 318) by aborting the operation.

If the client computer determines (at 306) that the operation involves a modification of nodes of the distributed B+-tree, then all such modifications are computed (at 310). Next, the client computer executes (at 312) a batch of actions to compare the collected version numbers to current version numbers of nodes in the traversed path, and if all comparisons succeed, apply all computed modifications to the nodes of the distributed B+-tree. The tasks at 314, 316, and 318 are next performed, as explained above.

In some embodiments, various enhancement features can be provided to increase performance. One of the enhancement features has already been mentioned above—this enhancement feature involves caching certain nodes of the B+-tree in the client computers so that servers containing such nodes do not have to be repeatedly accessed to obtain information pertaining to the nodes of the B+-tree. This helps to reduce the number of network roundtrips to the servers by client computers when navigating a tree.

Also, as another enhancement feature, to avoid any server from becoming a bottleneck when various client computers are trying to complete their respective operations, version numbers of nodes in the various servers can be replicated to other servers so that different client computers can access different servers for the version numbers of nodes of the B+-tree. Effectively, the version numbers associated with nodes contained in any particular server can be replicated to multiple servers such that the version number of a node in the particular server can be accessed on any of such multiple servers to distribute the load of version number checking.

Figures 5, 6:
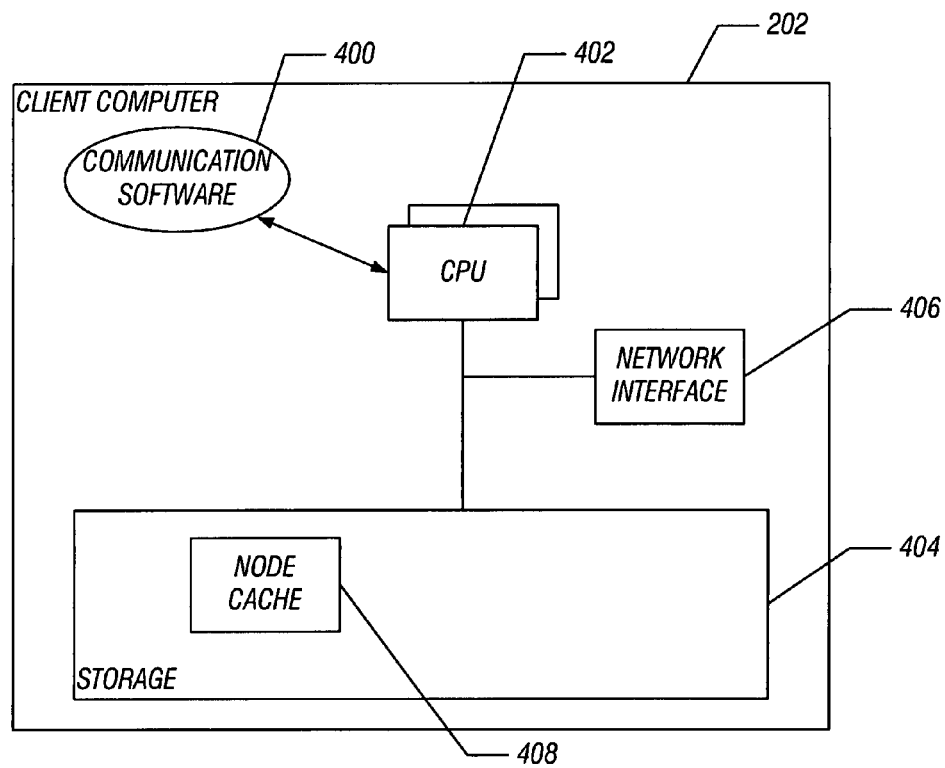
FIG. 5 is a block diagram of a client computer that is able to access a distributed B-tree according an embodiment.
FIG. 6 shows version tables maintained at multiple servers, in accordance with an embodiment.

FIG. 5 shows an example arrangement of a client computer 202 that includes communication software 400 executable on one or more central processing units (CPUs) 402. The communication software 400 is able to access the servers 200 depicted in FIG. 3 to perform a desired operation (key lookup, key insertion, key deletion, key update) with respect to the content of the nodes of the B+-tree. In an example context where the servers 200 are used to store a phone directory, the client computer 202 can be a computer (e.g., end user computer, application server, etc.), a software process of a computer, or a user at a computer, that is able to perform operations with respect to the distributed B+-tree.

The one or more CPUs 402 of the client computer 202 are connected to a storage 404 in the client computer 202, which can be implemented with one or more of the following: persistent storage (such as semiconductor storage or disk-based storage implemented with magnetic drives, optical drives, and so forth) or non-persistent storage such as dynamic random access memories (DRAMs), static random access memories (SRAMs), or other types of memory devices.

A node cache 408 is contained in the storage 404, where the node cache 408 is able to store certain nodes of the B+-tree contained in the servers 200 of FIG. 3. The node cache 408 includes those nodes of the B+-tree that change less frequently, such as the nodes of the upper levels of the B+-tree. It is noted that system performance is made more efficient by using the node cache 408. For example, to insert a key S, if a client computer caches nodes 1, 2, and 3 of the B+-tree depicted in FIG. 3, then the client computer can use the information contained in the node cache 408 to determine that a key S should be in node 7. The client computer then reads node 7 from server 2, and runs a batch of actions to atomically (1) check the version numbers of nodes 1, 3, and 7 against version numbers collected by the client computer (including version numbers collected from the information stored in the node cache 408), and (2) if the check is successful, insert S into node 7 and increment node 7's version number. Such a process takes just three network round-trips: one round-trip to read node 7, and two round-trips to execute the two-phase protocol to commit the batch.

The information contained in the node cache 408 may be out of date with actual servers, which may cause a batch to fail a check of version numbers. If the node cache 408 information is out of date, the client computer can refresh its cache and the operation can be retried. Correctness is preserved because if a batch fails, the B+-tree is not changed. Note that, effectively, the version number information associated with the nodes of a B+-tree is used to validate the content of the node cache 408.

Note that even if client computers use a node cache, the client computers still have to validate the information in their node cache against the B+-tree information contained in the servers, which means that the servers containing the traversed nodes of the B+-tree will have to be accessed to perform the validation. For example, every operation involves validating the version number of the root node, which means that the server containing the root node will have to be accessed on each operation. The server containing the root node can become a performance bottleneck.

To address this issue, version replication as noted above is performed, in which version numbers of nodes of the B+-tree can be replicated at several servers. A client computer can check the version number of a particular node against any of the servers in which the node is replicated.

As an example, FIG. 6 shows version information kept by each of servers 1, 2, 3, and 4. Version information can be kept in the form of a table that contains node numbers (identifying nodes of the B+-tree) and corresponding versions of the nodes. Each of the example tables of FIG. 6 includes a node column (containing node numbers) and a version column (containing version information). As depicted in FIG. 6, each of the four servers keeps the version number of the top-level nodes in the B+-tree, namely nodes 1, 2, and 3. In other words, the version information of the top-level nodes in the B+-tree is replicated across servers 1 to 4. A server also keeps the version number for its own leaf nodes. In the example of FIG. 6, the table for server 1 contains the information for leaf node 5 (which is in server 1 as depicted in FIG. 3), the table for server 2 contains the information for leaf node 7 (which is in server 2), and so forth.

To check the version number of the root node, a client computer can go to any of the four servers. By picking a server at random or using some other load balancing algorithm, load can be spread across the multiple servers for the purpose of checking the version number of the root node.

Effectively, according to some embodiments, the version number of all interior nodes (non-leaf nodes) can be replicated (as depicted in the example of FIG. 6). In many cases, the fan-out of a B+-tree is relatively large, which means that there are a relatively large number of leaf nodes, and as a result, non-leaf nodes make up just a relatively small fraction of the total number of nodes of the B+-tree. Moreover, since only version numbers associated with the nodes are replicated (and not entire nodes of the B+-tree), the amount of information replicated would not take up a lot of space in the servers.

Although node numbers are referred to simply as 1 to 9 in the above examples, it is noted that to ensure uniqueness of node numbers across multiple servers, a server number can be included as part of the number assigned to a node of a B+-tree.

Replicating version numbers introduces a new challenge: keeping multiple copies of the version number consistent. For example, if the version number of node 1 were to change from v2 to v3, this change should be applied to other servers on which the version number of node 1 is replicated. Also, the application of the version number change to the other servers has to be applied atomically so that there is no possibility that one client computer sees one version number for node 1 at one server while a different client computer sees a different version number for node 1 at a different server.

The atomic update of version numbers on multiple servers is accomplished by using an atomic batch of actions, in which the version information of multiple nodes in multiple servers can be performed atomically. For example, if a client computer wishes to insert key W, which involves a split of node 8 and a change at node 3 (see example of FIG. 3), the client computer creates a batch of actions that include the following: (1) check the version numbers of nodes 1, 3, and 8 (at any server that has such version numbers), and (2) if those checks succeed, modify nodes 3 and 8 and create node 9. Since the version number of node 3 is replicated across all servers, this same batch of actions also includes an additional action: update the version number of node 3 at all servers on which the version number has been replicated. Because the two-phase protocol ensures that the batch is executed atomically, client computers cannot see inconsistent version numbers for node 3.

For relatively small environments (e.g., B+-tree nodes distributed over less than 100 servers), replicating the version information of higher level B+-tree nodes across all servers is feasible. However, if the B+-tree is relatively large and is spread over many servers (e.g., hundreds or thousands of servers), it may not be desirable to replicate version information of every node at every server. The main reason is not that replicated version information would take up a lot of space, but that updating all replicas of version information in the hundreds or even thousands of servers imposes a substantial overhead.

In accordance with some embodiments, the version information of nodes at higher levels of the B+-tree are replicated at a larger number of servers than the version information of nodes at lower levels. The reason behind this is that the higher the level, the more frequently a version number is read and the less frequently the version number is updated. For example, the version number of the root node is checked for every operation (e.g., lookup, insert, update, delete), but the version number of the root node is only changed when there is a node split from the leaf node all the way to the root node, which is a relatively rare occurrence.

A mechanism according to some embodiments is provided to identify which nodes of the B+-tree are replicated on which servers. This mechanism uses a data structure referred to as vn-replica-set ("vn" stands for "version number"), which represents the set of servers on which the version number of a corresponding node is maintained.

Figure 7:
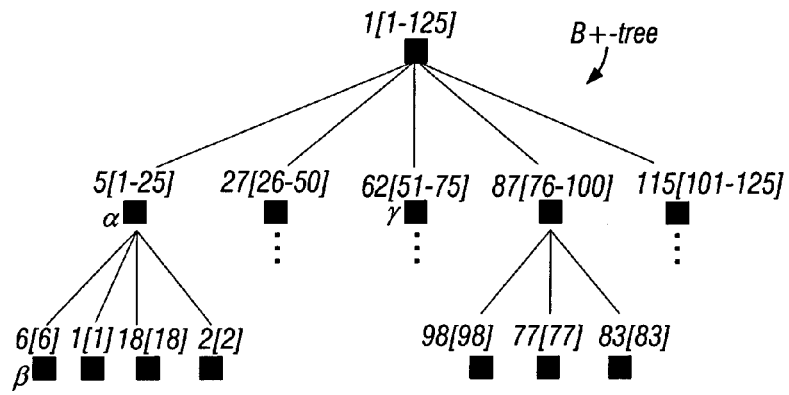
FIG. 7 shows locations of version replicas for a distributed B-tree, in accordance with an embodiment.

Reference is made to the example of FIG. 7, which shows an example B+-tree that is distributed across 125 servers. The root node of the B+-tree is stored at server 1 and its vn-replica-set includes a list of all the servers. The vn-replica-set in the example of FIG. 7 for the root node is [1-125], which means the version number of the root node is replicated at each of servers 1 to 125. In FIG. 7, the root node is associated with the following label: 1[1-125], where [1-125] represents servers 1 to 125, which are all servers that stores the version number of the root node, and the "1" before "[" represents the server (in this example server 1) on which the full content of the root node (not just its version number) is originally maintained.

More generally, a label i[vn-replica-set] associated with any given node of a B+-tree indicates that the given node is associated with vn-replica-set and that the full content of a given node is kept at server i.

For each node at level 2 (the level below the root node level), the vn-replica-set lists a smaller number of servers (25 servers in the example of FIG. 7). For example, the vn-replica-set of B+-tree node $\alpha$ on server 5 is [1-25], which means that the version number of node $\alpha$ on server 5 is replicated on each of servers 1 to 25. Similarly, the vn-replica-set of a node $\gamma$ on server 62 is [51-75], which means that the version number of node $\gamma$ on server 62 is replicated on each of servers 51 to 75.

For each leaf node, the vn-replica-set includes just the server that stores the leaf node (in other words, the version number of the leaf node is not replicated on any other server). In FIG. 7, the version number of node $\beta$ is kept at server 6, and only at server 6—the vn-replica-set of node $\beta$ is [6].

In choosing the vn-replica-sets, the following property is maintained: the vn-replica-set of a node is a subset of the vn-replica-set of its parent node. This is referred to as a parent-containment property. For example, in FIG. 7, the vn-replica-set of each of the four leftmost leaf nodes (whose vn-replica-sets each includes just a single server) is a subset of the vn-replica-set of the leaf node's parent, which includes servers 1 to 25. The vn-replica-set of each intermediate node is a subset of the vn-replica-set of the root node, which includes servers 1 to 125.

The reason for the parent-containment property is to reduce the number of servers that have to be contacted to check version numbers. More precisely, insertions, deletions, updates, and lookups into the B+-tree involve the check of the version numbers of every node from root to a leaf. With the parent-containment property, there will be a single server that holds all these version numbers. For example, in FIG. 7, if a new key is to be inserted into the leftmost leaf node 13, which is stored in server 6, the version number of this node and all its parents all the way to the root can be checked by just contacting server 6: the vn-replica-set of the leaf's parent $\alpha$ is servers 1 to 25, which include server 6, and the vn-replica-set of the root is servers 1 to 125, which also include server 6.

According to some embodiments, atomic multi-operation transactions are supported. Sometimes it is desirable to atomically insert several keys in a B+-tree, or atomically insert a key and remove another. This can be accomplished with multi-operation transactions, which allow the atomic execution of multiple lookups, inserts, updates, and deletes. More precisely, a multi-operation transaction is a sequence of lookups and modification operations to be performed on the B+-tree as a single indivisible transaction.

To enable a multi-operation transaction, the following is performed: (1) accumulate into a batch all version numbers to check as a result of all lookups, inserts, updates, and deletes, and all changes to the B+-tree as the result of all inserts, updates, and deletes in the transaction, and (2) execute the batch atomically using the same two-phase protocol discussed above for executing one operation at a time. In other words, rather than using the two-phase protocol to change the B+-tree nodes for a single insert or delete, the two-phase protocol can be used to change the B+-tree nodes involved for all lookups, inserts, updates and deletes in the multi-operation transaction.

The two-phase protocol used for single-operation or multi-operation transactions can atomically do the following: (1) check version numbers of several nodes at several servers against provided values (which are the version numbers collected by a client computer during the traversal through the B+-tree), and (2) if all checks are successful, modify several nodes at several servers. The two-phase protocol is in essence a two-phase commit protocol that embeds checks of version numbers.

Figure 8:
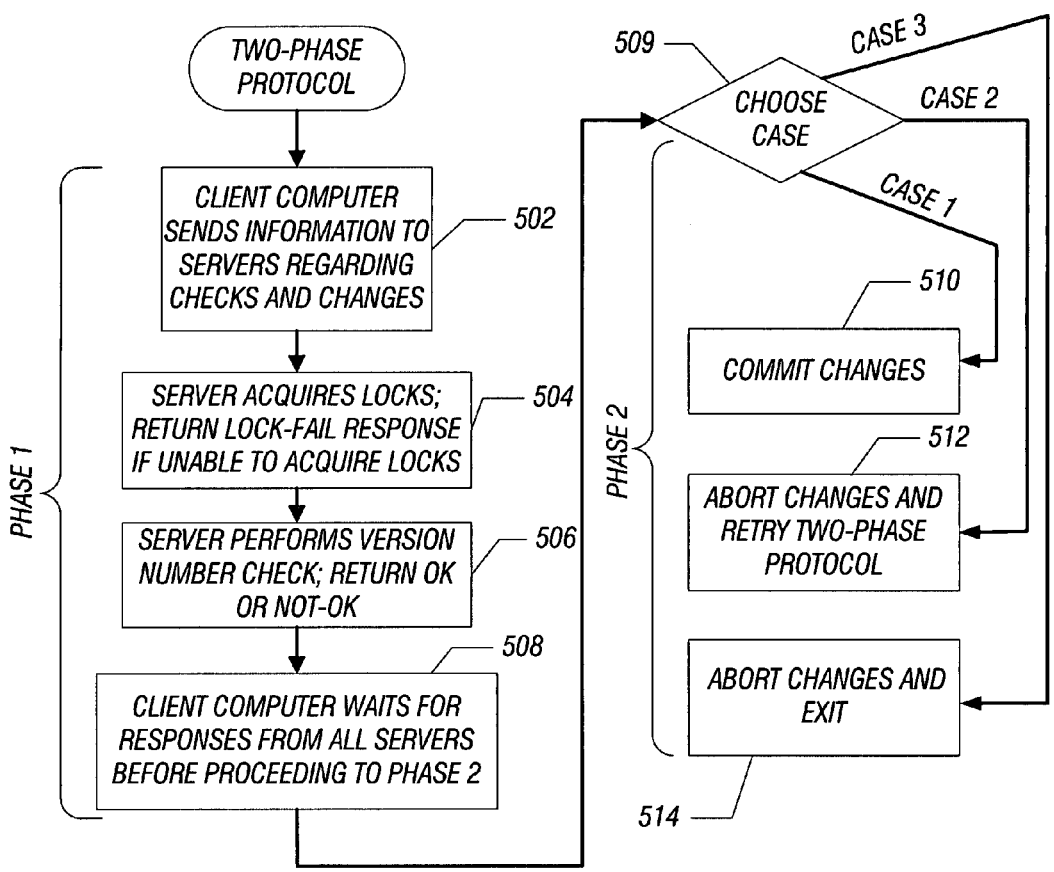
FIG. 8 is a flow diagram of a two-phase protocol according to an embodiment.

A client computer first initially determines all the version numbers that have to be checked, all the values such version numbers should be checked against, and all nodes that have to be modified if all those checks succeed. The two-phase protocol according to some embodiments is depicted in FIG. 8. In the first phase, the client computer contacts all servers where a version number is to be checked or a node is to be modified. For each of these servers, the client computer decides which checks and modifications apply to that server, and sends (at 502) this information to the server. All servers can be contacted in parallel by the client computer, for enhanced performance. The version number check and node update are to be performed by the server.

Upon being contacted by the client, a server attempts to acquire (at 504) a read-lock on the version number(s) that the client computer wants checked, and a write-lock on all B+-tree node(s) that the client computer wants changed. Note that the read-locks and write-locks are local to the server. If it is not possible to acquire the requested locks (because those locks are already held due to another client computer executing the two-phase protocol at intersecting nodes), the server returns a lock-fail response to the client computer. Otherwise, the server performs the version number check(s) (at 506) requested by the client computer (against the values supplied by the client computer). If the checks are successful, the server returns an OK response to the client computer. Otherwise, the server returns a NOT-OK response. Note that in the first phase, none of the servers actually commit any of the changes requested by the client. This will be done in the second phase, and only if all servers return an OK result.

Before moving to the second phase, the client computer waits (at 508) for responses from all servers that have been contacted. Once the responses are received, there are three possible cases that can be chosen (at 509). The first case is chosen (at 509) if all received responses are OK responses. As a result, the client computer notifies (at 510) the servers to commit the changes, which completes the two-phase protocol.

The second case is chosen (at 509) if at least one response is a lock-fail response and no responses are NOT-OK. In the second case, the client computer notifies (at 512) the servers to abort the changes, waits for a while (for example, using exponential backoff that selects a delay that exponentially varies with the number of retries), and then retries the two-phase protocol (both the first and second phases).

The third case is chosen (at 509) if at least one response is a NOT-OK response. As a result, in the second phase, the client computer notifies (at 514) the servers to abort the changes. Then, the client computer does not retry the first and second phases; the client computer simply exits the two-phase protocol with a version mismatch error. Upon seeing a version mismatch error, the B+-tree nodes whose version numbers did not match are re-read, and a different batch is then prepared to execute using the two-phase protocol.

A scenario is possible where a client computer fails while executing a two-phase protocol. In such a scenario, some servers will not know whether to commit or abort the second phase, and these servers will fail to release the locks acquired in the first phase, which is undesirable. To address this scenario, a recovery protocol is implemented. More precisely, a "cleaner process" is provided that runs periodically looking for servers that are hanging (those servers waiting for a second-phase message for longer than a threshold time). The cleaner process can be software executable on the client computers or servers. If the cleaner process finds servers that are hanging, the cleaner process determines whether the client computer has notified some server to commit; if so, the cleaner process notifies all servers to commit. Otherwise, the cleaner process notifies all servers to abort.

Instructions of software described above (including software in client computers and/or servers) are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method, executed by at least one processor, of accessing data, comprising:
    accessing, by the at least one processor during an operation, a distributed balanced tree having a plurality of nodes distributed across plural servers;
    accessing, by the at least one processor, version information associated with the nodes of the distributed balanced tree;
    during the operation, checking, by the at least one processor, the version information to determine whether content of one or more nodes of the distributed balanced tree has changed during the operation;
    in response to determining based on checking the version information that the content of the one or more nodes of the distributed balanced tree has changed, aborting the operation; and
    replicating the version information of at least a particular one of the nodes of the distributed balanced tree on multiple servers, wherein replicating the version information comprises replicating version information of higher-level nodes in the distributed balanced tree on a greater number of servers than version information of lower-level nodes in the distributed balanced tree.

2. The method of claim 1, wherein accessing the distributed balanced tree comprises accessing a distributed B-tree.

3. The method of claim 1, wherein checking the version information is part of a protocol that performs a batch of actions atomically.

4. The method of claim 3, wherein the protocol comprises a two-phase protocol that places locks on certain nodes of the distributed balanced tree.

5. The method of claim 4, wherein checking the version information is part of a first phase of the two-phase protocol, wherein performing the aborting is part of a second phase of the two-phase protocol.

6. The method of claim 5, further comprising committing the operation in response to the version information check indicating that the content of the one or more nodes of the distributed balanced tree has not changed during the operation, wherein the committing is performed as part of the second phase of the two-phase protocol.

7. The method of claim 1, further comprising:
    caching information of certain nodes of the distributed balanced tree in a client computer,
    wherein the operation is performed in response to a request by the client computer.

8. The method of claim 1, further comprising:
    in response to a change of the particular node, updating the version information by each of the multiple servers on which the version information is replicated.

9. The method of claim 1, further comprising:
    storing a first data structure identifying servers on which the version information of the particular node of the distributed balanced tree is stored.

10. The method of claim 9, wherein the particular node has a parent node, the method further comprising:
    storing a second data structure identifying servers on which the version information of the parent node is stored,
    wherein the second data structure identifies a greater number of servers than the first data structure.

11. The method of claim 1, wherein the version information of each of leaf nodes of the distributed balanced tree are kept in a single respective server.

12. The method of claim 1, further comprising:
    performing plural modification operations that access nodes of the distributed balanced tree in a multi-operation transaction that performs the plural modification operations atomically.

13. The method of claim 12, further comprising:
    identifying version information that has to be validated;
    identifying nodes of the distributed balanced tree that have to be modified by the multi-operation transaction; and
    performing the version information validating and modification of identified nodes atomically.

14. A method comprising:

storing a distributed B-tree across plural servers;

storing version information associated with nodes of the distributed B-tree;

receiving, by at least one processor, a request, during an operation that accesses the distributed B-tree, to validate version information of the nodes;

providing feedback, to a client computer, regarding the validating of the version information;

receiving, from the client computer, an indication whether to abort or commit a modification of one or more nodes of the distributed B-tree performed by the operation, wherein the indication is responsive to the feedback;

checking for at least one server that is hanging due to no receipt of the indication; and causing an abort or commit of the modification if the checking finds the at least one server that is hanging.

15. A non-transitory computer-usable storage medium containing instructions that when executed cause at least one computer to:

access, during an operation, a distributed balanced tree having a plurality of nodes distributed across plural servers;

access version information associated with the nodes of the distributed balanced tree;

during the operation, check the version information to determine whether content of one or more nodes of the distributed balanced tree has changed during the operation;

in response to determining based on checking the version information that the content of the one or more nodes of the distributed balanced tree has changed, abort the operation; and replicate the version information of at least a particular one of the nodes of the distributed balanced tree on multiple servers, wherein replicating the version information comprises replicating version information of higher-level nodes in the distributed balanced tree on a greater number of servers than version information of lower-level nodes in the distributed balanced tree.

16. The method of claim 1, further comprising:

in response to determining based on checking the version information that the content of the one or more nodes of the distributed balanced tree has not changed, committing the operation.

17. The method of claim 14, wherein the indication is an indication to abort the operation if the feedback indicates that a portion of the distributed B-tree has changed during the operation.

18. The method of claim 17, wherein the indication is an indication to complete the operation if the feedback indicates that the distributed B-tree has not changed during the operation.

19. The non-transitory computer-usable storage medium of claim 15, which wherein the instructions when executed cause the at least one computer to further:

in response to determining based on checking the version information that the content of the one or more nodes of the distributed balanced tree has not changed, allowing the operation to complete.

* * * * *